US012715412B2

(12) United States Patent
Nagata

(10) Patent No.: US 12,715,412 B2
(45) Date of Patent: Aug. 25, 2026

(54) BRAKE DEVICE

(71) Applicant: Hitachi Astemo, Ltd., Hitachinaka (JP)

(72) Inventor: Daiki Nagata, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 489 days.

(21) Appl. No.: 17/911,476

(22) PCT Filed: Mar. 19, 2021

(86) PCT No.: PCT/JP2021/011357
§ 371 (c)(1),
(2) Date: Sep. 14, 2022

(87) PCT Pub. No.: WO2021/215156
PCT Pub. Date: Oct. 28, 2021

(65) Prior Publication Data

US 2023/0091307 A1 Mar. 23, 2023

(30) Foreign Application Priority Data

Apr. 20, 2020 (JP) ................................ 2020-074802

(51) Int. Cl.
*B60T 13/74* (2006.01)
*F16D 65/18* (2006.01)
(Continued)

(52) U.S. Cl.
CPC ............ *B60T 13/746* (2013.01); *F16D 65/18* (2013.01); *B60T 1/065* (2013.01); *F16D 2121/24* (2013.01); *F16D 2125/50* (2013.01)

(58) Field of Classification Search
CPC ............ F16D 2125/50; F16D 2125/40; F16D 2121/24; F16D 65/18; B60T 13/741; B60T 13/746
See application file for complete search history.

(56) References Cited

U.S. PATENT DOCUMENTS 11,453,374 B2 * 9/2022 Mitsugi ................ F16D 55/224
2007/0062769 A1 * 3/2007 Noh ..................... B60T 13/588 188/162
(Continued)

FOREIGN PATENT DOCUMENTS

JP 2016-125544 7/2016
JP 2018-146017 9/2018
(Continued)

OTHER PUBLICATIONS

English abstract for KR-20100135561-A (no date).*
(Continued)

*Primary Examiner* — Nicholas J Lane
(74) *Attorney, Agent, or Firm* — Wenderoth, Lind & Ponack, L.L.P.

(57) ABSTRACT

A planetary gear speed reducing mechanism installed in a disc brake as a brake device includes a small diameter shaft portion to which rotation from an electric motor is transmitted, and a sun gear to which rotation from the small diameter shaft portion is transmitted. The small diameter shaft portion has outer diameter that is smaller than tip diameter of the sun gear. It is therefore possible to reduce torque loss from the electric motor, for example, during operation of a parking brake, and repress a deterioration in torque transmission efficiency.

3 Claims, 4 Drawing Sheets

(51) Int. Cl.

| | |
|---|---|
| *B60T 1/06* | (2006.01) |
| *F16D 121/24* | (2012.01) |
| *F16D 125/50* | (2012.01) |

(56) References Cited

U.S. PATENT DOCUMENTS

| | | | | |
|---|---|---|---|---|
| 2013/0299288 | A1* | 11/2013 | Ryu | F16D 55/226<br>188/72.4 |
| 2017/0082159 | A1* | 3/2017 | Son | F16D 65/18 |
| 2021/0039620 | A1* | 2/2021 | Mitsugi | F16D 65/183 |
| 2022/0379866 | A1* | 12/2022 | Sim | F16H 1/28 |
| 2022/0396252 | A1* | 12/2022 | Karajgi | B60T 13/741 |
| 2022/0396253 | A1* | 12/2022 | Karajgi | B60T 13/741 |

FOREIGN PATENT DOCUMENTS

| | | | | |
|---|---|---|---|---|
| KR | 20100135561 A | * | 12/2010 | F16D 65/183 |
| WO | WO-2019198509 A1 | * | 10/2019 | F16D 65/183 |

OTHER PUBLICATIONS

International Search Report issued Apr. 20, 2021 in International Application No. PCT/JP2021/011357, with English translation.

Written Opinion of the International Searching Authority issued Apr. 20, 2021 in International Application No. PCT/JP2021/011357, with English translation.

* cited by examiner

BRAKE DEVICE

TECHNICAL FIELD

The invention relates to brake devices used for braking vehicles.

BACKGROUND ART

Patent Literature 1 discloses a disc brake as a brake device which comprises a speed reducing mechanism for actuating a parking brake that is used for parking a vehicle or for other like situations. The invention disclosed in the Patent Literature 1 utilizes a planetary gear speed reducing mechanism as a speed reducing mechanism to which rotation from a motor is transmitted. The planetary gear speed reducing mechanism comprises a sun gear (sun gear) of a second speed reducing gear which is rotatably supported by a shaft, a plurality of planetary gears (planetary gears) meshed with the sun gear and arranged at intervals along the outer peripheral surface of the sun gear, and an internal gear (internal gear) meshed with the planetary gears and supported by a housing so as not to make a relative rotation.

A supporting structure of another planetary gear speed reducing mechanism than the disc brake according to the Patent Literature 1 is also utilized. Specifically, the second speed reducing gear of the planetary gear speed reducing mechanism includes a shaft portion extending from a radial center portion of the second speed reducing gear in the axial direction in a concentric manner. A sun gear is formed on the outer peripheral surface of the distal end of the shaft portion. The internal gear includes a cylindrical supporting portion extending from a radial center portion of the internal gear in the axial direction in a concentric manner. The shaft portion of the second speed reducing gear includes a region in which the sun gear is not formed. The region is rotatably supported by the cylindrical supporting portion of the internal gear through a bearing portion.

CITATION LIST

Patent Literature

PTL 1: Japanese Unexamined Patent Publication (Kokai) No. 2016-125544

SUMMARY OF INVENTION

Solution to Problem

The supporting structure of the latter planetary gear speed reducing mechanism requires the sun gear disposed on the outer peripheral surface of the distal end of the shaft portion of the second speed reducing gear to pass through the cylindrical supporting portion of the internal gear at the time of assembly. The cylindrical supporting portion therefore has inner diameter that is larger than tip diameter of the sun gear. In this structure, however, outer diameter of the shaft portion (bearing portion) that is rotatably supported within the cylindrical supporting portion through the bearing portion inevitably becomes large, and a contact portion between the shaft portion and the bearing portion is further away from a rotational center. Consequently, a great torque loss is caused by friction applied to the contact portion, which becomes a factor for a deterioration in torque transmission efficiency.

An object of the invention is to provide a brake device that reduces torque loss from an electric motor, for example, during operation of a parking brake, and represses a deterioration in torque transmission efficiency.

Means for Solving the Problem

A brake device according to one embodiment of the invention comprises a planetary gear speed reducing mechanism to which rotation from an electric motor is transmitted. The brake device converts a rotational motion transmitted from the planetary gear speed reducing mechanism into a linear motion to propel a pressing member, causing a braking member to press a braked member. The planetary gear speed reducing mechanism comprises a shaft portion to which rotation from the electric motor is transmitted, and a sun gear to which rotation from the shaft portion is transmitted. The shaft portion has outer diameter that is smaller than tip diameter of the sun gear.

The brake device according to the one embodiment of the invention reduces torque loss from the electric motor, for example, during operation of a parking brake and represses a deterioration in torque transmission efficiency.

DESCRIPTION OF EMBODIMENTS

Embodiments will be described in detail with reference to FIGS. 1 to 4. In the description, the inside (inner side) of a vehicle is referred to as one end side (cover member 22 side), and the outside (outer side) of the vehicle is referred to as the other end side (disc rotor D side), as necessary. That is, the right side is referred to as one end side, and the left side is referred to as the other end side in FIGS. 1 and 2, as appropriate.

First, a disc brake 1A according to a first embodiment which functions as a brake device will be described with reference to FIGS. 1 to 3.

Figure 1:
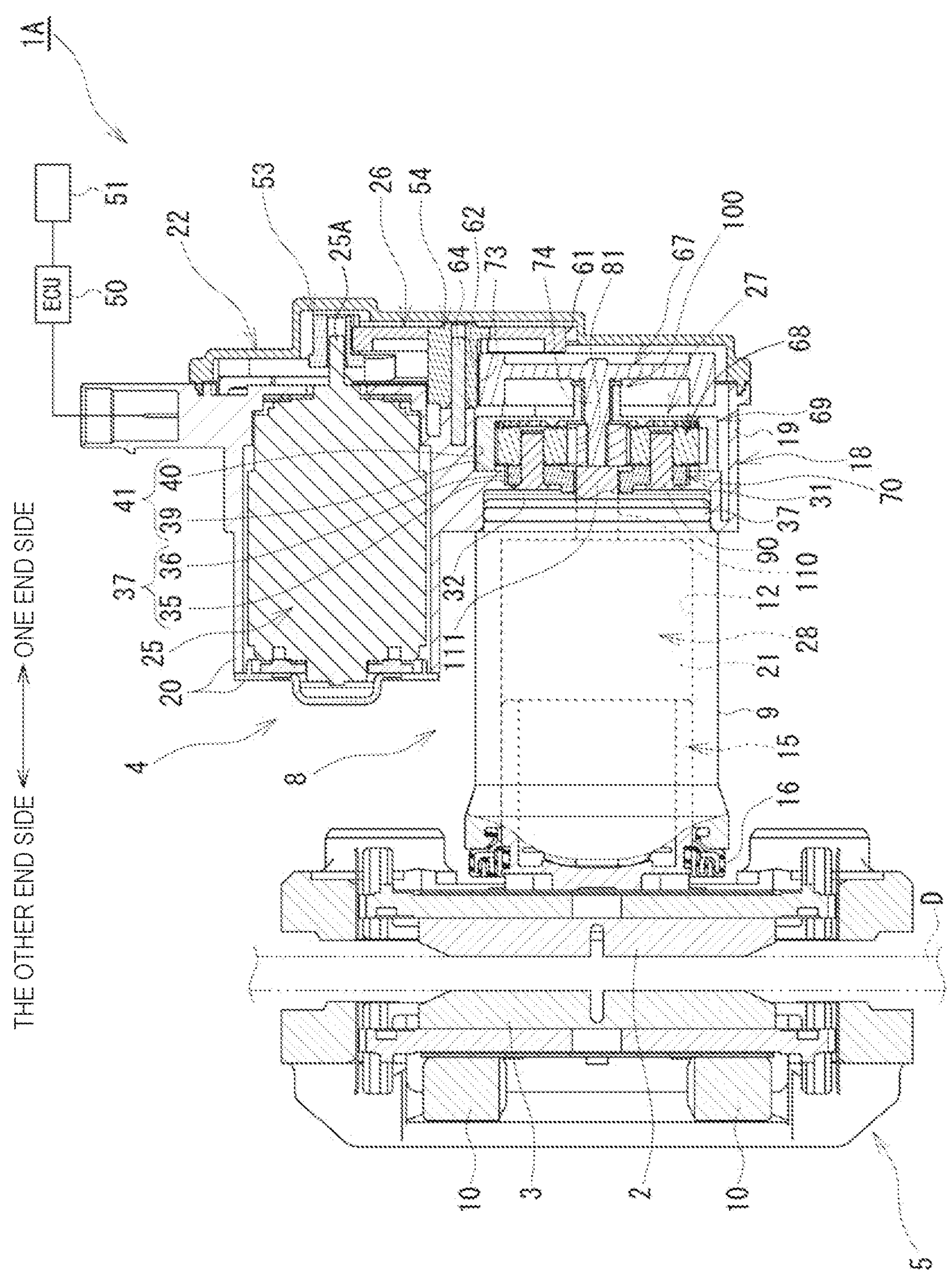
FIG. 1 is a cross-sectional view of a disc brake according to a first embodiment.

As illustrated in FIG. 1, the disc brake 1A according to the first embodiment comprises a pair of an inner brake pad 2 and an outer brake pad 3 arranged on respective axial sides of a disc rotor D so as to hold the disc rotor D therebetween, the disc rotor D being mounted on a rotational part of a vehicle, and a caliper 4. The disc brake 1A is configured as a caliper floating-type. The pair of the inner brake pad 2 and the outer brake pad 3 and the caliper 4 are supported by a bracket 5 to be movable in an axial direction of the disc rotor D. The bracket 5 is fixed to anon-rotational part, such as a knuckle, in the vehicle. The pair of the inner brake pad 2 and the outer brake pad 3 corresponds to a braking member. The disc rotor D corresponds to a braked member.

As illustrated in FIG. 1, a caliper body 8 that is a main body of the caliper 4 is arranged on a base end side facing the inner brake pad 2. The caliper body 8 comprises a cylindrical cylinder portion 9 that opens toward the inner brake pad 2, and a pair of claw portions 10, 10 that outwardly extends from the cylinder portion 9 across the disc rotor D and faces the outer brake pad 3, the pair of claw portions being arranged at a distal end side. A piston 15 is accommodated in the cylinder portion 9 of the caliper body 8, that is, a cylinder bore 12 of the cylinder portion 9, so as not to make a relative rotation with respect to the cylinder portion 9 and to be movable in the axial direction. The piston 15 presses the inner brake pad 2 and is formed into a shape of a bottomed cup. The piston 15 is accommodated in the cylinder bore 12 of the cylinder portion 9 so that a bottom portion of the piston 15 faces the inner brake pad 2. Due to a rotation locking engagement between the bottom portion of the piston 15 and the inner brake pad 2, the piston 15 is supported so as not to make a relative rotation with respect to the cylinder bore 12, and therefore the caliper body 8. The piston 15 corresponds to a pressing member.

A piston seal, not shown, is arranged on an inner peripheral surface of the other end side of the cylinder bore 12 of the cylinder portion 9. The piston 15, in a position being in contact with the piston seal, is accommodated in the cylinder bore 12 to be movable in the axial direction. Formed between the piston 15 and a bottom surface of the cylinder portion 9 is a hydraulic pressure chamber 21 that is defined by the piston seal. Hydraulic pressure is supplied to the hydraulic pressure chamber 21 from a hydraulic pressure source, not shown, such as a master cylinder and a hydraulic control unit, through a hydraulic pressure line, not shown, disposed in the cylinder portion 9. A dust boot 16 is placed between the outer peripheral surface on the bottom portion side of the piston 15 and the inner peripheral surface of the other end side of the cylinder bore 12. The piston seal and the dust boot 16 prevent foreign matter from entering the cylinder bore 12 of the cylinder portion 9.

A housing 18 is mounted on the bottom portion of the cylinder portion 9 of the caliper body 8. The housing 18 includes an open portion at one end thereof which is air-tightly closed by a cover member 22. A seal member 37 is disposed between a fitting concave portion 31 of the housing 18 and the cylinder portion 9. The seal member 37 maintains airtightness in the housing 18. Referring also to FIGS. 2 and 3, the housing 18 comprises a first housing portion 19 that accommodates a part of a spur gear multistage speed reducing mechanism 26 and a planetary gear speed reducing mechanism 27, both discussed later, in such a manner as to cover an outer periphery of the bottom portion of the cylinder portion 9, and a second housing portion 20 that is formed integrally with the first housing portion 19 so as to protrude from the first housing portion 19 toward the other end side into a shape of a bottomed cylinder and accommodates an electric motor 25 discussed later. As is understood from FIG. 1, the cylinder portion 9 of the caliper body 8 and the electric motor 25 are arranged side by side.

Figure 2:
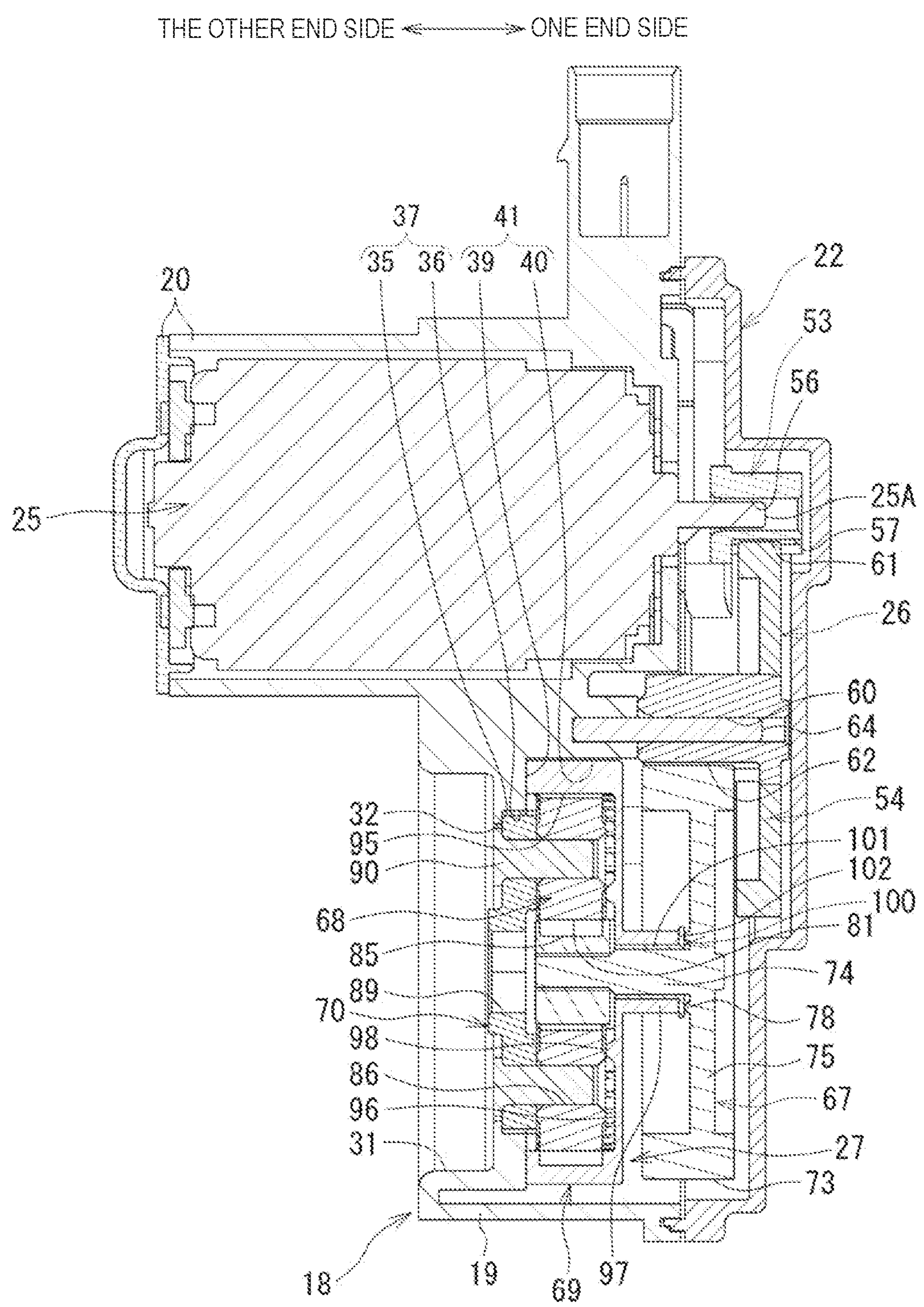
FIG. 2 is an enlarged cross-sectional view of a relevant part of the disc brake of FIG. 1.
Figure 3:
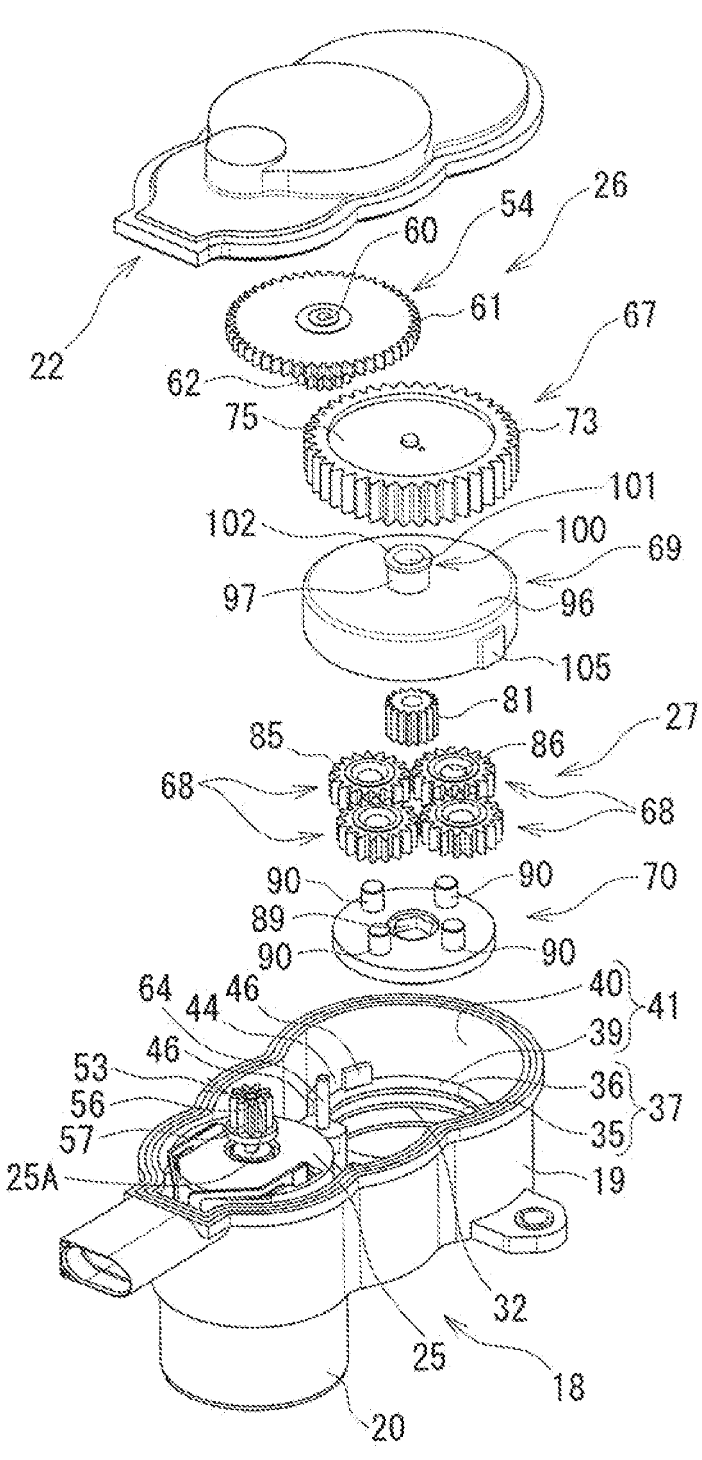
FIG. 3 is an explosive perspective view of the relevant part of the disc brake of FIG. 1.

As illustrated in FIGS. 2 and 3, the first housing portion 19 is formed into a substantially cylindrical shape that is open at one end side and includes an open portion 32 at the other end side. As already mentioned, a part of the spur gear multistage speed reducing mechanism 26 and the planetary gear speed reducing mechanism 27 are accommodated in an interior portion of the first housing portion 19. The fitting concave portion 31 is formed at the other end side of the first housing portion 19. The bottom portion of the cylinder portion 9 is fitted in the fitting concave portion 31 in an airtight manner by the seal member 37. The open portion 32 is formed in the bottom portion of the fitting concave portion 31. A first step portion 37 is formed on the one end side of the open portion 32. The first step portion 37 includes a first annular surface 35 and a first circumferential wall surface 36. The planetary gear speed reducing mechanism 27 includes a carrier 70 discussed later which is rotatably supported by the first step portion 37. A second step portion 41 is formed on the one end side of the first step portion 37. The second step portion 41 includes a second annular surface 39 and a second circumferential wall surface 40.

The planetary gear speed reducing mechanism 27 includes an internal gear 69 discussed later which is supported by the second step portion 41 (second annular surface 39) of the first housing portion 19 so as not to make a relative rotation and to be restricted in radial and axial displacement. Referring to FIG. 3, engagement concave portions 44, 44 are formed at opposite positions on the second circumferential wall surface 40 of the second step portion 41 of the first housing portion 19. FIG. 3 shows only one of the engagement concave portions 44, 44. The engagement concave portion 44 is made by forming two convex portions 46, 46 in an inner wall surface of the first housing portion 19, leaving a space therebetween in a circumferential direction. When protrusions 105, 105 disposed in the internal gear 69 are engaged with the engagement concave portions 44, 44, the internal gear 69 is so supported as not to make a relative rotation with respect to the first housing portion 19 and to be restricted in radial displacement. Referring to FIG. 3, the second circumferential wall surface 40 of the second step portion 41 is partially open at the electric motor 25 side in a circumferential direction to be formed into a shape of the letter "C" in a planar view.

As illustrated in FIG. 1, the caliper body 8 comprises the electric motor 25 as an electric motor, the spur gear multistage speed reducing mechanism 26 and the planetary gear speed reducing mechanism 27 which increase rotational torque from the electric motor 25, and a piston thrust mechanism 28 that converts a rotational motion from the spur gear multistage speed reducing mechanism 26 and the planetary gear speed reducing mechanism 27 into a linear motion to impart a thrust force to the piston 15 and maintains the piston 15 at a braking position after the piston 15 is propelled. The electric motor 25 is connected with an electronic control unit (ECU) 50 for controlling the rotation of the electric motor 25. The electronic control unit 50 is connected with a parking switch 51 that is operated when a parking brake is turned ON/OFF. The electronic control unit 50 is capable of actuating the parking brake in response to a signal from a vehicle side, instead of in response to the operation of the parking switch 51. The electric motor 25 is, as already mentioned, accommodated in the second housing portion 20 of the housing 18. A part of the spur gear multistage speed reducing mechanism 26 and the planetary gear speed reducing mechanism 27 are accommodated in the first housing portion 19 of the housing 18.

As illustrated in FIGS. 2 and 3, the spur gear multistage speed reducing mechanism 26 comprises a pinion gear 53 and a first speed reducing gear 54. The pinion gear 53 includes an aperture portion 56 that is formed into a cylindrical shape and into which a rotary shaft 25A of the electric motor 25 is press-fitted, and a gear 57 that is formed at an outer periphery of the pinion gear 53. A shaft hole 60 is formed at a radial center of the first speed reducing gear 54 and extends in the axial direction. The first speed reducing gear 54 includes a large gear 61 with a large diameter and a small gear 62 with a small diameter which are formed in an integral manner. The large gear 61 is meshed with the gear 57 of the pinion gear 53. The small gear 62 extends from the large gear 61 in the axial direction in a concentric manner. The small gear 62 extends integrally from a radial center portion of the large gear 61 toward the other end side. A shaft

64 is rotatably supported in the shaft hole 60 of the first speed reducing gear 54. The shaft 64 includes the other end that is integrally fixed to a wall portion between the first housing portion 19 and the second housing portion 20 of the housing 18. The small gear 62 of the first speed reducing gear 54 is meshed with the planetary gear speed reducing mechanism 27.

The planetary gear speed reducing mechanism 27 comprises a second speed reducing gear 67, a sun gear 81, a plurality of (four in the present embodiment) planetary gears 68, the internal gear 69, and the carrier 70. The second speed reducing gear 67, the sun gear 81, the internal gear 69, and the carrier 70 are arranged to be concentric with one another. The second speed reducing gear 67 comprises a large gear 73 meshed with the small gear 62 of the first speed reducing gear 54, and a small diameter shaft portion 74 with small diameter which extends from the large gear 73 in the axial direction in the concentric manner. The large gear 73 comprises a circular wall portion 75 that is integrally formed closely to one end of the large gear 73. The circular wall portion 75 extends in a radially inward direction. A circular ring-like protrusion 78 is provided in the other end surface of the circular wall portion 75 closely to a radial center of the other end surface so as to protrude toward the other end side into a circular ring-like shape. The small diameter shaft portion 74 extends integrally from a radial center portion of the circular wall portion 75 of the large gear 73 toward the other end side in a concentric manner. The small diameter shaft portion 74 includes a distal end portion that is coupled to the sun gear 81 so as not to make a relative rotation with respect to each other. For example, the distal end portion of the small diameter shaft portion 74 and the sun gear 81 are splined together. A base end portion side of the small diameter shaft portion 74 has outer diameter that is smaller than tip diameter of the sun gear 81.

Each of the planetary gears 68 includes a gear 85 meshed with the sun gear 81, and a pin hole 86, through which a pin 90 extends in a rotatable manner. The pins 90 are formed in the carrier 70 in a standing manner. The planetary gears 68 are arranged at regular intervals on a circumferential region of the carrier 70 discussed later. The carrier 70 is formed into a circular disc. The carrier 70 is rotatably supported by the first annular surface 35 of the first step portion 37 of the first housing portion 19. A polygonal hole 89 is formed through the carrier 70 at a substantially center in the radial direction. The plurality of pins 90 are formed on an outer peripheral side of one end surface of the carrier 70 to protrude toward the one end side. The pins 90 are formed in a protruding manner at intervals in a circumferential direction. The pins 90 extend through the pin holes 86 of the planetary gears 86 in a rotatable manner. This makes it possible to transmit an orbital motion of each of the planetary gears 68 to the carrier 70. As illustrated in FIGS. 1 and 2, a polygonal shaft portion 111 of a spindle 110 of the piston thrust mechanism 28 (rotary-linear motion conversion mechanism) discussed later is fitted in the polygonal hole 89 of the carrier 70. This makes it possible to transmit rotational torque between the carrier 70 and the spindle 110.

Referring to FIGS. 2 and 3, the internal gear 69 comprises an internal tooth 95 meshed with the gears 85 of the planetary gears 68, the circular ring-like wall portion 96 extending continuously from one end of the internal tooth 95 in the radially inward direction, and a cylindrical supporting portion 97 extending continuously from a radially inner end portion of the circular ring-like wall portion 96 toward the one end side in a concentric manner. The cylindrical supporting portion 97 is concentrically arranged on a radially outer side of the base end portion side of the small diameter shaft portion 74 of the second speed reducing gear 67. A slide bearing 100 is arranged between the cylindrical supporting portion 97 and the base end portion side of the small diameter shaft portion 74 of the second speed reducing gear 67. The slide bearing 100 comprises a cylindrical bearing portion 101 and an annular flange portion 102 extending from one end of the bearing portion 101 in a radially outward direction. The bearing portion 101 is arranged between the cylindrical supporting portion 97 of the internal gear 69 and the base end portion side of the small diameter shaft portion 74 of the second speed reducing gear 67. Disposed on the other end surface of the circular ring-like wall portion 96 is a circular ring-like protrusion 98 that is formed closely to a radial center so as to protrude toward the other end side into a circular ring-like shape. The circular ring-like protrusion 98 restricts an axial displacement of each of the planetary gears 68.

The annular flange portion 102 of the slide bearing 100 is held between one end surface of the cylindrical supporting portion 97 of the internal gear 69 and the circular ring-like protrusion 78 disposed in the other end surface of the circular wall portion 75 of the second speed reducing gear 67 (large gear 73). The slide bearing 100 supports the small diameter shaft portion 74 of the second speed reducing gear 67 to be rotatable relative to the cylindrical supporting portion 97 of the internal gear 69. The second speed reducing gear 67 is therefore rotatably supported by the internal gear 69 through the slide bearing 100.

As illustrated in FIG. 3, protrusions 105, 105 are formed in an outer peripheral surface of a region of the internal tooth 95 of the internal gear 69 at a pitch of 180 degrees in the circumferential direction. The protrusions 105, 105 are formed to protrude in the radially outward direction. FIG. 3 only shows one of the protrusions 105, 105. As stated above, the other end surface of the internal gear 69 is brought into abutment with the second annular surface 39 of the second step portion 41 of the first housing portion 19, and the protrusions 105, 105 of the internal gear 69 are brought into engagement with the engagement concave portions 44, 44 of the first housing portion 19 of the housing 18, whereby the internal gear 69 is restricted in axial and radial displacement and supported so as not to make a relative rotation with respect to the first housing portion 19.

As illustrated in FIG. 1, the piston thrust mechanism 28 is constructed as a rotary-linear motion conversion mechanism. The piston thrust mechanism 28 converts a rotational motion transmitted from the spur gear multistage speed reducing mechanism 26 and the planetary gear speed reducing mechanism 27, that is, a rotational motion transmitted from the spindle 110 into a linear motion. The piston thrust mechanism 28 then imparts a thrust force to the piston 15 through the displacement of a linear motion member, not shown, of the piston thrust mechanism 28, to thereby propel the piston 15 (move the piston 15 toward the other end side). At the same time, the piston thrust mechanism 28 maintains the piston 15 at the braking position. The piston thrust mechanism 28 is arranged inside the cylinder bore 12 to be located between the bottom surface of the cylinder bore 12 and the piston 15. When the spindle 110 rotates along with the rotation of the carrier 70, the linear motion member of the piston thrust mechanism 28 is advanced toward the other end side by action of the piston thrust mechanism 28, which advances the piston 15. The piston 15 thus presses the inner and outer brake pads 2, 3 against the disc rotor D and maintains the braking state thereof.

Operation of the disc brake 1A according to the first embodiment will be now described.

First of all, the operation of the disc brake 1A as a normal hydraulic brake when braking is applied by operation of a brake pedal, not shown, will be described.

When the brake pedal is depressed by a driver, hydraulic pressure corresponding to force on the brake pedal is supplied from a hydraulic pressure source, such as a master cylinder, through a hydraulic pressure line, both not shown, into the hydraulic pressure chamber 21 located within the cylinder portion 9 (cylinder bore 12) of the caliper body 8. The piston 15 then advances (moves leftward in FIG. 1) from an initial position where the piston 15 is when braking is not applied, elastically deforming the piston seal, to thereby press the inner brake pad 2 against the disc rotor D. Due to a reaction force against a pressing force applied onto the inner brake pad 2 by the piston 15, the caliper body 8 moves inward (rightward in FIG. 1) in relation to the bracket 5, which causes the claw portions 10, 10 to push the outer brake pad 3 against the disc rotor D. Consequently, the disc rotor D is tightly held between the pair of inner and outer brake pads 2, 3, which generates a friction force. A braking force for the vehicle is thus generated.

When the driver releases the brake pedal, the hydraulic pressure supply from the hydraulic pressure source, such as a master cylinder, is discontinued, and the hydraulic pressure within the hydraulic pressure chamber 21 is decreased. The piston 15 is thus retracted to the initial position due to a restoring force generated by elastic deformation of the piston seal, and the braking force is released. If a displacement amount of the piston 15 is increased along with the friction of the inner and outer brake pads 2, 3, and the elastic deformation of the piston seal exceeds a limit, slippage occurs between the piston 15 and the piston seal. Due to the slippage, the initial position of the piston 15 in relation to the caliper body 8 is displaced, and pad clearance is adjusted to be constant.

The following description explains operation of the invention as a parking brake which is an example of operation for maintaining a parked condition of the vehicle.

First, when the parking brake is actuated (applied) by operating the parking switch 51 while the parking brake is in a released position, the electric motor 25 is driven in an apply direction in response to a command from the electronic control unit 50, to thereby rotate the sun gear 81 of the planetary gear speed reducing mechanism 27 through the spur gear multistage speed reducing mechanism 26. The rotation of the sun gear 81 makes each of the planetary gears 68 rotate on its own axis and revolve about an axis of the sun gear 81 at the same time, thereby making the carrier 70 rotate. The rotation from the carrier 70 is transmitted to the spindle 110. The outer diameter of the base end portion side of the small diameter shaft portion 74 of the second speed reducing gear 67 that is a constituent element of the planetary gear speed reducing mechanism 27 is smaller than the tip diameter of the sun gear 81, and distance from a radial center of the small diameter shaft portion 74 to a contact portion of the small diameter shaft portion 74 which comes into contact with the bearing portion of the slide bearing 100 can be made as short as possible. It is then possible to reduce torque loss caused by friction between the small diameter shaft portion 74 and the slide bearing 100.

When the spindle 110 rotates, the linear motion member of the piston thrust mechanism 28 is advanced by action of the piston thrust mechanism 28, which advances the piston 15. As the result of the advancement of the piston 15, the inner brake pad 2 is pushed against the disc rotor D. Due to the reaction force against the pressing force applied onto the inner brake pad 2 by the piston 15, the caliper body 8 moves inward (rightward in FIG. 1) in relation to the bracket 5, which causes the claw portions 10, 10 to push the outer brake pad 3 against the disc rotor D. Consequently, the disc rotor D is tightly held between the pair of inner and outer brake pads 2, 3, which generates a friction force. The braking force for the vehicle is thus generated, and the braking state of the vehicle can be maintained.

In the electronic control unit 50, the electric motor 25 keeps being driven until the pressing force acting onto the disc rotor D through the pair of inner and outer brake pads 2, 3 reaches a predetermined value, or for example, until a current value of the electric motor 25 reaches a predetermined value. The electronic control unit 50 then detects that the pressing force acting onto the disc rotor D reaches the predetermined value from the fact that the current value of the electric motor 25 reaches the predetermined value. Energization of the electric motor 25 is then discontinued.

When the brake is released, in response to a command from the electronic control unit 50, the rotary shaft 25A of the electric motor 25 rotates in a reverse direction, namely, a release direction, and at the same time, the reverse rotation is transmitted through the spur gear multistage speed reducing mechanism 26 and the planetary gear speed reducing mechanism 27 to the spindle 110. Along with the reverse rotation of the spindle 110, the linear motion member of the piston thrust mechanism 28 is retracted into an initial position by action of the piston thrust mechanism 28, and the braking force applied to the disc rotor D by the pair of inner and outer brake pads 2, 3 is released.

The torque loss that is caused when the rotational torque from the second speed reducing gear 67 is transmitted through the sun gear 81 to the planetary gears 68 results from the slippage on meshed surfaces of the sun gear 81 and the gears 85 of the planetary gears 68, and the friction at the contact portion between the base end portion side of the small diameter shaft portion 74 of the second speed reducing gear 67 and the bearing portion 101 of the slide bearing 100. The torque loss caused by the friction can be obtained by multiplying a friction force generated at the contact portion between the base end portion side of the small diameter shaft portion 74 of the second speed reducing gear 67 and the bearing portion 101 of the slide bearing 100 by distance from the radial center of the small diameter shaft portion 74 to the contact portion.

In the disc brake 1A according to the first embodiment, the small diameter shaft portion 74 of the second speed reducing gear 67, to which the rotation from the electric motor 25 is transmitted, and the sun gear 81 are configured as separate elements. The distal end portion of the small diameter shaft portion 74 of the second speed reducing gear 67 is coupled to the sun gear 81 so as not to make a relative rotation. The outer diameter of the base end portion side of the small diameter shaft portion 74 is smaller than the tip diameter of the sun gear 81. Distance from the radial center of the small diameter shaft portion 74 to the contact portion of the small diameter shaft portion 74, which comes into contact with the bearing portion 101 of the slide bearing 100, therefore can be made as short as possible. This makes it possible to reduce the torque loss from the electric motor 25 and repress a deterioration in torque transmission efficiency.

In the disc brake 1A according to the first embodiment, the small diameter shaft portion 74 extending from the radial center portion of the large gear 73 of the second speed reducing gear 67 toward the other end side in the concentric manner is rotatably supported by the cylindrical supporting portion 97 of the internal gear 69 through the slide bearing 100. This ensures effective use of space inside the first housing portion 19.

Figure 4:
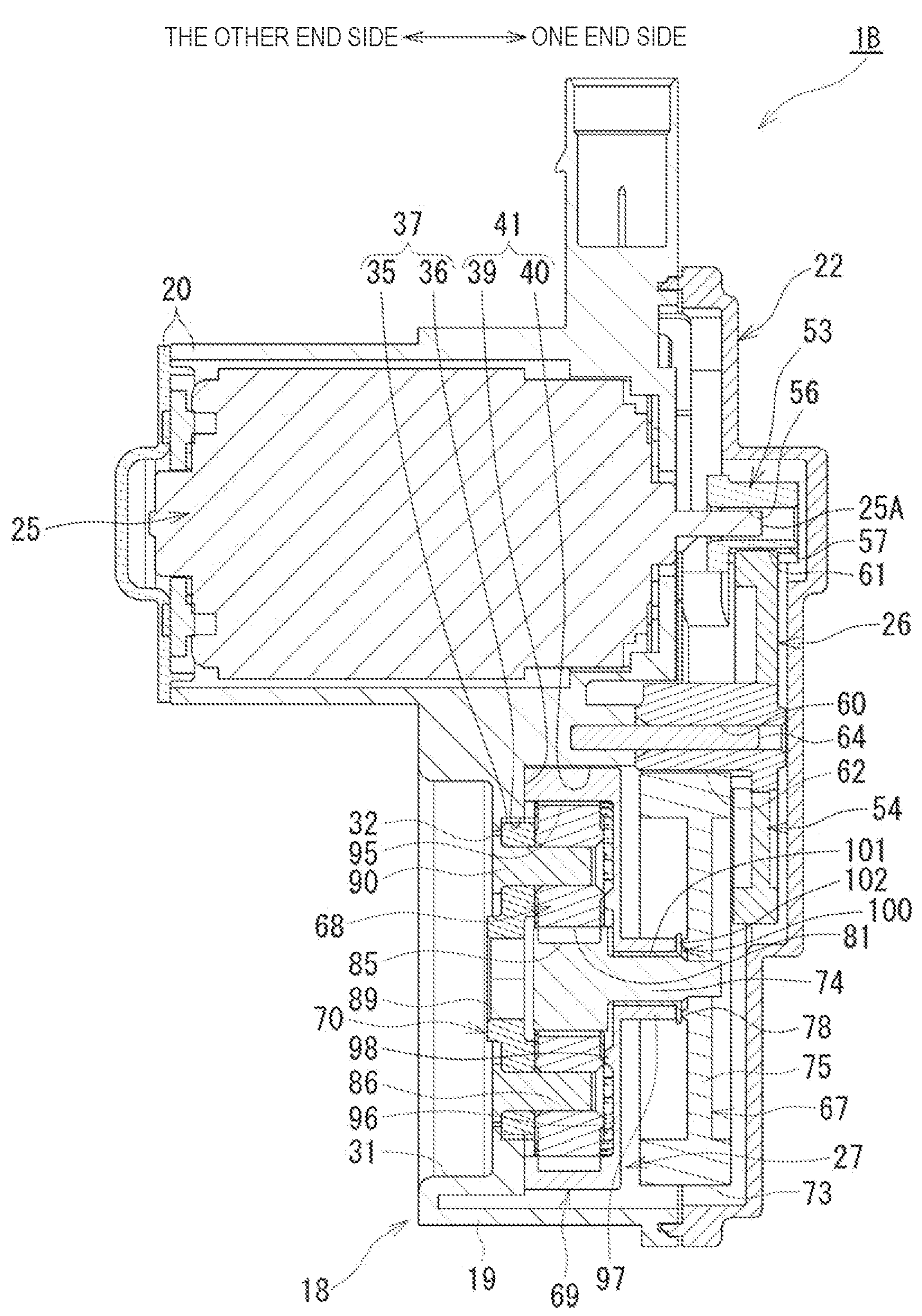
FIG. 4 is an enlarged cross-sectional view of a relevant part of a disc brake according to a second embodiment.

A disc brake 1B according to a second embodiment as a brake device will be now described with reference to FIG. 4. The following description of the disc brake 1B of the second embodiment only explains differences from the disc brake 1A of the first embodiment.

The disc brake 1B according to the second embodiment is configured as below. In a planetary gear speed reducing gear mechanism 27, a small diameter shaft portion 74 extends from a radial center portion of one end surface of a sun gear 81 toward one end side in the concentric manner. The small diameter shaft portion 74 has outer diameter that is smaller than tip diameter of the sun gear 81. The small diameter shaft portion 74 is rotatably supported within a cylindrical supporting portion 97 of an internal gear 69 through a slide bearing 100. The small diameter shaft portion 74 includes a distal end portion (one end portion) that is coupled to a radial center portion of a circular wall portion 75 of a large gear 7 that is a constituent element of a second speed reducing gear 67 so as not to make a relative rotation with respect to each other. The disc brake 1B according to the second embodiment therefore also provides similar operation and advantageous effects to the disc brake 1A according to the first embodiment.

According to the foregoing description, the embodiments in which the outer diameter of the small diameter shaft portion 74 extending from the large gear 73 (circular wall portion 75) of the second speed reducing gear 67 or the sun gear 81, which is rotatably supported by the internal gear 69 is smaller than tip diameter of the sun gear 81 is applied to the disc brakes 1A, 1B in which the braking force is generated by driving the electric motor 24 at the time of activation of the parking disc brake used for parking a vehicle. It is also possible, however, to apply the aforementioned embodiments to an electric drum brake in which a braking force is generated by driving the electric motor 25 at the time of normal braking.

The above-described disc brakes (brake devices) 1A, 1B based on the first and second embodiments may be configured, for example, in the following modes.

A first mode provides a brake device (1A, 1B) comprising a planetary gear speed reducing mechanism (27), to which rotation from an electric motor (25) is transmitted. The brake device converts a rotational motion transmitted from the planetary gear speed reducing mechanism (27) into a linear motion to propel a pressing member (15), causing a braking member (2, 3) to press a braked member (D). The planetary gear speed reducing mechanism (27) comprises a shaft portion (74) to which the rotation from the electric motor (25) is transmitted, and a sun gear (81) to which rotation from the shaft portion (74) is transmitted. The shaft portion (74) has outer diameter that is smaller than tip diameter of the sun gear (81).

In a second mode according to the first mode, the planetary gear speed reducing mechanism (27) comprises a plurality of planetary gears (68) meshed with the sun gear (81) and arranged at intervals in a circumferential direction of the sun gear (81), and an internal gear (69) including an internal tooth (95) meshed with the planetary gears (68), the internal gear (69) being arranged to enclose the planetary gears (68). The shaft portion (74) is rotatably supported by the internal gear (69).

In a third mode according to the first or second mode, the shaft portion (74) extends from a gear (73) to which the rotation from the electric motor (25) is transmitted, in an axial direction of the gear (73) in a concentric manner.

In a fourth mode according to the first or second mode, the shaft portion (74) extends from the sun gear (81) in an axial direction of the sun gear (81) in a concentric manner.

The invention is not limited to the aforementioned embodiments and include various modifications. For example, the embodiments are intended to explain the invention in detail to facilitate the understanding of the invention and are not necessarily have to include all the configurations mentioned above. The configuration of any one of the embodiments may be partially replaced with that of another embodiment. The configuration of any one of the embodiments also may be added to that of another embodiment. The configuration of any one of the embodiments may be partially added to, omitted from or replaced with another configuration.

The present application claims priority under Japanese Patent Application No. 2020-074802 filed on Apr. 20, 2020. The entire disclosure of Japanese Patent Application No. 2020-074802 filed on Apr. 20, 2020, including the description, claims, drawings and abstract, is incorporated herein by reference in its entirety.

REFERENCE SIGN LIST

1A, 1B: Disc brake (brake device)
2: Inner brake pad (braking member)
3: Outer brake pad (braking member)
15. Piston (pressing member)
25: Electric motor (electric motor)
27: Planetary gear speed reducing mechanism
68: Planetary gear
69: Internal gear
73: Large gear (gear)
74: Small diameter shaft portion (shaft portion)
81: Sun gear
D: Disc rotor (Braked member)

The invention claimed is:

1. A brake device comprising:

a planetary gear speed reducing mechanism, to which rotation from an electric motor is transmitted, the brake device being configured to convert a rotational motion transmitted from the planetary gear speed reducing mechanism into a linear motion to propel a pressing member, causing a braking member to press a braked member, wherein the planetary gear speed reducing mechanism includes a shaft portion to which the rotation from the electric motor is transmitted, a sun gear to which rotation from the shaft portion is transmitted, a plurality of planetary gears meshed with the sun gear and arranged at intervals in a circumferential direction of the sun gear, an internal gear including an internal tooth meshed with the planetary gears, the internal gear being arranged to enclose the planetary gears, and a speed reducing gear arranged to be concentric with the sun gear and the internal gear, wherein the shaft portion extends from the speed reducing gear in an axial direction in a concentric manner, wherein the shaft portion has an outer diameter that is smaller than a tip diameter of the sun gear, wherein the shaft portion is rotatably supported by the internal gear through a slide bearing, wherein the slide bearing comprises a cylindrical bearing portion and an annular flange portion extending from one end of the cylindrical bearing portion in a radially outward direction, wherein the cylindrical bearing portion is arranged radially between a cylindrical supporting portion of the internal gear and a base end portion side of the shaft portion, and wherein the annular flange portion is held axially between an end surface of the cylindrical supporting portion of the internal gear and a circular ring-like protrusion disposed on an end surface of a circular wall portion of the speed reducing gear.

2. The brake device according to claim 1, wherein the shaft portion extends from a gear to which the rotation from the electric motor is transmitted, in an axial direction of the gear in a concentric manner.

3. The brake device according to claim 1, wherein the shaft portion extends from the sun gear in an axial direction of the sun gear in a concentric manner.

* * * * *